(12) United States Patent
Nilsson et al.

(10) Patent No.: US 12,197,612 B2
(45) Date of Patent: Jan. 14, 2025

(54) SECURE CONTENT MANAGEMENT AND VERIFICATION SYSTEMS AND METHODS

(71) Applicant: Intertrust Technologies Corporation, Milpitas, CA (US)

(72) Inventors: Jarl Nilsson, Mountain View, CA (US); Eric Swenson, Soquel, CA (US); Michael Manente, Sudbury, MA (US)

(73) Assignee: Intertrust Technologies Corporation, Berkeley, CA (US)

( * ) Notice: Subject to any disclaimer, the term of this patent is extended or adjusted under 35 U.S.C. 154(b) by 185 days.

(21) Appl. No.: 17/960,008

(22) Filed: Oct. 4, 2022

(65) Prior Publication Data

US 2023/0103486 A1  Apr. 6, 2023

Related U.S. Application Data

(60) Provisional application No. 63/262,082, filed on Oct. 4, 2021.

(51) Int. Cl.
| | |
|---|---|
| *G06F 21/62* | (2013.01) |
| *G06F 16/951* | (2019.01) |
| *G06F 21/64* | (2013.01) |
| *H04L 9/00* | (2022.01) |

(52) U.S. Cl.
CPC ........ *G06F 21/6218* (2013.01); *G06F 16/951* (2019.01); *G06F 21/64* (2013.01); *H04L 9/50* (2022.05)

(58) Field of Classification Search
CPC ..... H04L 9/20; H04L 9/3247; G06F 21/6218; G06F 16/951; G06F 21/64

USPC ......................................................... 726/26
See application file for complete search history.

(56) References Cited

U.S. PATENT DOCUMENTS

| | | | |
|---|---|---|---|
| 9,754,131 B2 * | 9/2017 | Wilson | G06F 21/64 |
| 9,870,508 B1 * | 1/2018 | Hodgson | H04N 21/2347 |
| 10,176,309 B2 * | 1/2019 | Tormasov | G06F 21/16 |
| 10,606,986 B2 * | 3/2020 | Maher | G06F 21/10 |
| 10,999,079 B2 * | 5/2021 | Schmidt | H04L 9/3228 |
| 2017/0237554 A1 * | 8/2017 | Jacobs | H04W 12/106 713/171 |
| 2018/0068091 A1 * | 3/2018 | Gaidar | G06F 21/16 |
| 2020/0081998 A1 * | 3/2020 | Androulaki | H04L 9/0819 |
| 2022/0038261 A1 * | 2/2022 | Rice | G06F 21/645 |

\* cited by examiner

*Primary Examiner* — Sargon N Nano

(74) *Attorney, Agent, or Firm* — John P. Davis; Thayne and Davis LLC

(57) ABSTRACT

This disclosure relates to, among other things, systems and methods for managing and/or verifying the integrity and/or provenance of digital content and/or media. Embodiments of the systems and methods disclosed herein may provide a mechanism for generating a secure records relating to digital content and/or other media by capturing records relating to creation and/or modification actions performed in connection with digital content and/or media and storing such records in a ledger. Trusted services that examine captured information recorded in trusted databases and/or ledgers and generate derivative information relating to associated content and/or media. When viewing content, trusted content applications may query the trusted service for derivative information relating to the content and/or media, providing users with an indication of the derivative information in connection with content and/or media playback.

16 Claims, 8 Drawing Sheets

SECURE CONTENT MANAGEMENT AND VERIFICATION SYSTEMS AND METHODS

RELATED APPLICATIONS

This application claims the benefit of priority under 35 U.S.C. § 119(e) to U.S. Provisional Patent Application No. 63/262,082 filed Oct. 4, 2021, and entitled "SECURE CONTENT MANAGEMENT AND VERIFICATION SYSTEMS AND METHODS," the contents of which is hereby incorporated by referenced in its entirety.

COPYRIGHT AUTHORIZATION

Portions of the disclosure of this patent document may contain material which is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

SUMMARY

The present disclosure relates generally to systems and methods for securely managing and/or verifying the integrity and/or provenance of digital content and/or media. More specifically, the present disclosure relates to systems and methods for managing and/or verifying the integrity and/or provenance of digital content and/or media using trusted content services and/or applications.

Digital content and/or media has become the primary form of content that consumers interact with in a variety of contexts including, for example and without limitation, entertainment, education, news and/or information consumption, and/or the like. The ease of creating and/or modifying digital content and/or media, however, introduces difficulties in ensuring the integrity and authenticity of content viewed by consumers and/or the ability for consumers to be able to ascribe a measure of trust in the content they consume.

Embodiments of the systems and methods disclosed herein may provide a mechanism for generating secure records relating to digital content and/or other media. In some embodiments, records may be captured relating to creation and/or modification actions performed in connection with digital content and/or media. Captured records may, in some embodiments, be stored in one or more trusted databases and/or ledgers such as a blockchain. Embodiments of disclosed systems and methods may provide for trusted content applications (e.g., trusted browser applications) that interact with such trusted databases and/or ledgers and/or derivatives thereof and provide users with one or more indicia of the integrity, authenticity, and/or provenance of content they view using the applications.

Further embodiments of the disclosed systems and methods may provide for one or more trusted services that examine captured information recorded in trusted databases and/or ledgers and generate derivative information relating to associated content and/or media. In some embodiments, the derivative information may comprise one or more indicia and/or attributes relating to the content and the examined information in the trusted databases and/or ledgers associated with the content. Derivative information may be recorded in one or more trusted databases and/or ledgers, which in some embodiments may comprise one or more blockchain ledgers, although other database and/or ledger structures and/or architectures may also be used in connection with various disclosed embodiments.

In some embodiments, trusted services may examine digital content and/or media (e.g., image and/or video content associated with webpages), and information recorded in trusted databases and/or ledgers and associate attributes with the content. In certain embodiments, trusted services may associate attribute information after analyzing a content item and/or information recorded in trusted databases and/or ledgers directly with the content item (e.g., within content metadata). In further embodiments, attribute information associated with content may be recorded in one or more databases and/or ledgers, which may be associated and/or otherwise managed by the trusted services.

For example and without limitation, a trusted service consistent with various embodiments disclosed herein may crawl through image and/or video content on webpages, examine one or more trusted ledgers and/or databases to determine whether the image and/or video content is associated with information recorded in the databases and/or ledgers (e.g., information indicating a registration and/or prior validation of the image and/or video content), and/or generate and/or otherwise associate attribute information associated with the image and/or video content based on the results of the examination. When viewing content, trusted content applications may query the trusted service for attribute information associated with the viewed content, which may be provided to a user via some indication (e.g., a visual indication such as an authentication watermark). In this manner, users may be provided with an indicia of the integrity, authenticity, veracity, and/or provenance of content they view using the trusted application.

In various disclosed embodiments, trusted databases, ledgers, and/or the like, may be used to record and/or otherwise manage various assertions associated with actions performed in connection with digital content, including assertions relating to content attribution, ownership, creation, modification (which may include the generation of new content derived from and/or otherwise incorporating digital content), processing, and/or the like. Trusted databases and/or ledgers consistent with certain embodiments disclosed herein may, among other things, facilitate one or more of:

- Creating a digital record and/or proof of origin of digital media (e.g., video content, audio content, image content, text content, digital stream content, etc.).
- Providing an anonymous proof of attribution, ownership, and/or original creation for digital media.
- Providing a traceable chain of handling and/or indication of provenance for digital media.
- Providing consumers with a trusted way to audit and/or otherwise verify a digital claim associated with digital media.

In some embodiments, such databases and/or ledgers may be distributed, and may be referred to herein as trusted immutable distributed assertion ledgers ("TIDALs"), and/or variations of the same. Databases and/or ledgers may, in various embodiments, be public, private, and/or a combination thereof. In certain embodiments, a TIDAL may comprise a public indelible distributed database ("PIDD"). TIDALs consistent with various aspects of the disclosed embodiments may be associated with a variety of properties including, for example, ledger processes that may be resistant to byzantine failures, entries that may be immutable and/or relatively immutable, entries that may be time-synced (at least in part), entries that may be scalable, and/or entries that may be available for relatively fast lookup.

Trusted ledgers, including TIDALs, may be implemented, at least in part, using various blockchain technologies. Users of trusted ledgers may post entries into a sequenced database. Each entry may have an associated message, a digital signature of the message (which may be referred to herein in certain instances as simply a "signature" and/or derivatives of the same), and some associated verification key which others can use to verify that a person with the verification key's associated signing key has signed the message.

In various embodiments of the disclosed trusted ledgers, entries may be appended to the ledger. Each addition of an entry may be witnessed by a number of parties, which may be referred to in certain instances herein as ledger nodes, and entries may be accompanied by various auxiliary cryptographic information to ensure that changes to messages in the database and/or the ordering of entries can be detected. Entries may reside in a unique numerical position in the ledger, and once all witnesses agree to add an entry to the ledger, it is difficult to alter an entry's presence, contents, and/or position in the ledger without detection by the witnesses.

Witnesses may take a variety of forms. For example, as in many blockchain-based ledgers used to support cryptographic currencies, a witness may be any suitably configured computer. In other implementations, systems associated with independent entities and/or companies joined in a consortium, which may have certain permissions and/or configurations to support the maintenance and/or management of ledgers, may operate as witnesses.

Although various embodiments and/or examples described herein relate to managing digital content and/or media, it will be appreciated that embodiments of the disclosed systems and methods are not so limited. Indeed, embodiments disclosed herein may be used in connection with a variety of types of information management, verification, and/or validation, as well as a variety of other contexts, applications, and/or use cases.

BRIEF DESCRIPTION OF THE DRAWINGS

The inventive body of work will be readily understood by referring to the following detailed description in conjunction with the accompanying drawings, in which.

DETAILED DESCRIPTION

Figure 1:
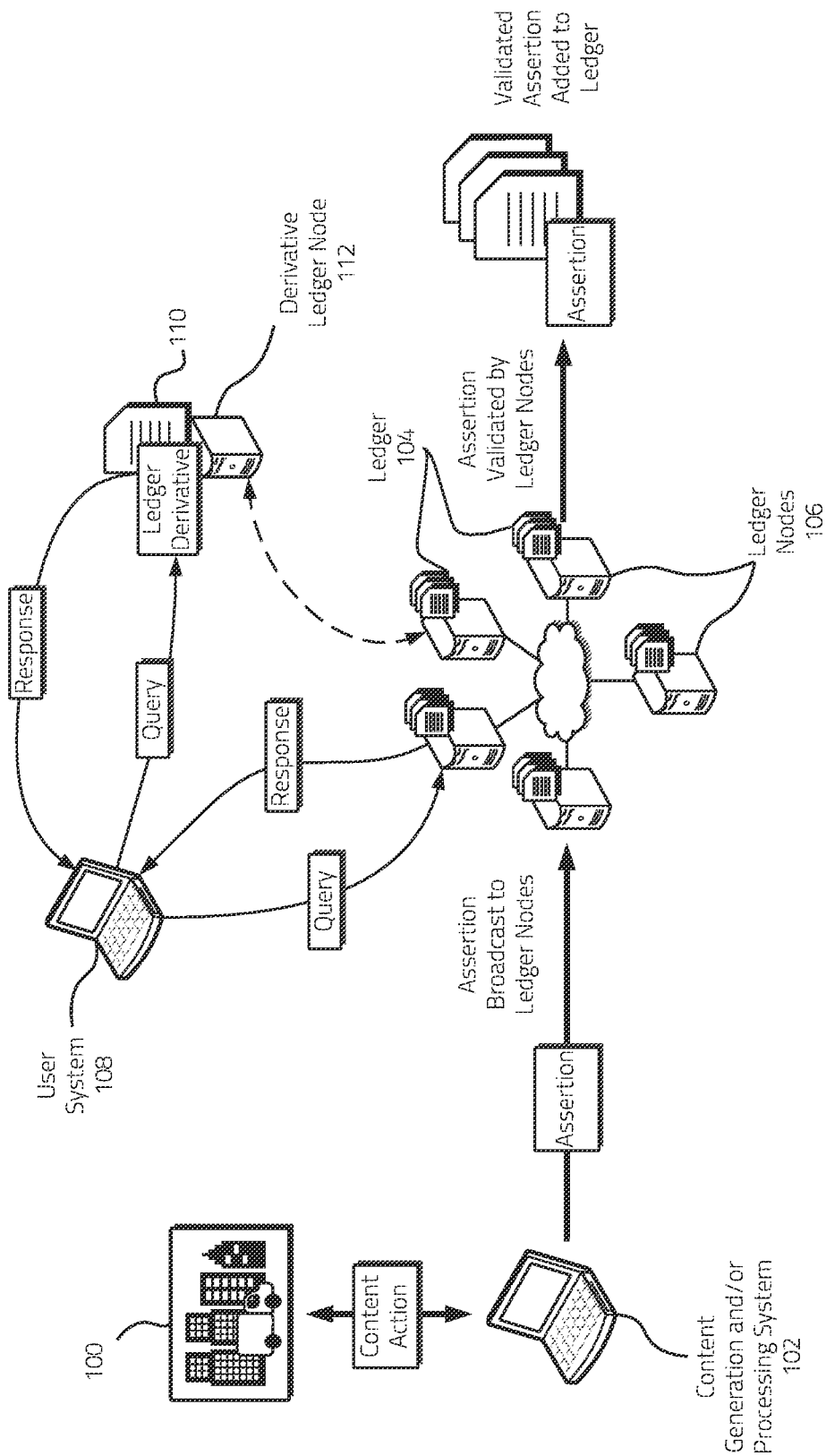
FIG. 1 illustrates a non-limiting example of an architecture for managing and/or otherwise verifying the integrity of digital content using a trusted ledger consistent with certain embodiments disclosed herein.

A description of systems and methods consistent with embodiments of the present disclosure is provided herein. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

The embodiments of the disclosure may be understood by reference to the drawings, where in certain instances, but not necessarily all instances, like parts may be designated by like numerals or descriptions. The components of the disclosed embodiments, as generally described and/or illustrated in the figures herein, could be arranged and designed in a wide variety of different configurations. Thus, the following description of the embodiments of the systems and methods of the disclosure is not intended to limit the scope of the disclosure, but is merely representative of possible embodiments of the disclosure. In addition, the steps of any method disclosed herein do not necessarily need to be executed in any specific order, or even sequentially, nor need the steps be executed only once, unless otherwise specified.

Embodiments of the disclosed systems and methods may allow for the establishment and/or verification of the credibility, authenticity, integrity, and/or provenance of digital content and/or media and/or other information. Digital content and/or media, which may be generally described in certain instances herein as content, may comprise, for example and without limitation, image content, video content, audio content, text content, any other type of content relating to a variety of subjects and/or interests, and/or combinations of thereof.

In some embodiments, the integrity of content may be established by creating digital signatures and/or fingerprints of content and/or actions performed in connection with such content and making these signatures accessible to consuming users and/or services, which may comprise trusted services. In certain embodiments, a digital signature and/or fingerprint of content and/or actions performed in connection with content may comprise, for example and without limitation, generating a digest of a content file (e.g., a hash of the content file) and then cryptographically signing the hash with a key associated with a creator, system, service, and/or other entity that performed an action in the lifecycle of the content (e.g., a content modifier and/or the like).

In further embodiments, integrity may be established based on a notion of trusted entities. Digital signatures may be used to establish a history of editing, processing, and/or transformation actions performed in connection with digital content and/or particulars of various events associated with the content. Transparency may be provided by publishing the signatures of events in an immutable and/or otherwise indelible ledger and/or database such as, for example, a blockchain and/or other ledger and/or databases such as a TIDAL.

Content credibility, authenticity, integrity, and/or provenance verification, consistent with certain embodiments disclosed herein, may involve producing and/or recording evidence that can be used to authenticate content by various content ecosystem participants and, subsequently, verifying such evidence in connection with authentication and/or verification processes when an entity wants to determine the credibility, authenticity, integrity, and/or provenance of the content. Various embodiments of the disclosed systems and methods may provide effective ways to both produce and/or record authentication evidence and to verify such evidence using content credibility, authenticity, integrity, and/or provenance verification processes.

Trusted Ledgers

Consistent with various embodiments disclosed herein, trusted ledger and/or database technology such as blockchain and/or other distributed ledger technologies that may securely and/or immutably record transactions and/or events at scale may be used to build a digital media integrity verification service. For example, in certain embodiments, a blockchain may be established comprising a distributed database and/or ledger of assertions recording information about digital media and/or associated events. Entities may submit new entries that relate to the creation, modification and/or transformation, and/or distribution of digital media. Submitters may use an associated submitter public key to sign a binding of a subject public key to an assertion (e.g., in some circumstances, the subject could be the submitter's public key).

Trusted immutable databases and/or ledgers consistent with various aspects of the disclosed embodiments may be associated with a variety of properties that may include one or more of:

Ledger processes that may be resistant to byzantine failures.
Entries that may be immutable.
Entries that may be time synched (at least in part). Distinguished sets of new entries (e.g., such as blocks in a blockchain) may have an immutable ordering whereby newer (e.g., newer in actual time) entries may be relatively higher in order than earlier entries. Entries may be timestamped to identify a specific time of entry.
Ledgers may be scalable in number of entries.
Entries in a ledger may be available for relatively fast lookup and/or search.

In certain embodiments, scalability and fast lookup and/or search may be achieved and/or otherwise improved by using derivatives of an immutable ledger, if not by the ledger itself.

Consistent with various disclosed embodiments, ledger paradigms may comprise permissioned blockchains that use relatively efficient byzantine agreement protocols. In some embodiments, ledger entries may comprise assertions, made by a class of qualified submitters, that each binds a key (and/or a hash or other derivative of a key) with other attributes that are associated with that key, such as the identity of an entity associated with the key and/or an alias thereof, the scope of authority of the key owner, information rights management permissions, and/or the like.

In various embodiments, a ledger may be distributed among a plurality of nodes. For example, in some embodiments, a TIDAL may be used in connection with the disclosed embodiments. In certain embodiments, TIDAL actors, nodes, and/or entities may include assertion submitters, witnesses and/or verifiers, and/or distributed ledger node operators. In other embodiments, a ledger used in connection with the disclosed systems and methods may not necessarily be distributed.

In certain embodiments, a ledger and/or database may comprise a blockchain, although other database and/or ledger structures may be used. For example, hash graphs, tangles or directed, acyclic graphs, and/or the like may also be used in connection with various aspects of the disclosed embodiments. In some embodiments, ledgers may be publicly available, but in other embodiments they may not necessarily be publicly available. For example, in connection with various aspects of the disclosed embodiments, ledgers may not necessarily be publicly accessible in every application, with some applications using multiple ledgers, some of which may be public and some private.

In certain implementations, a number of ledgers may be employed, each of which may specialize in the recording of various types of assertions with appropriate policies for the associated assertion types. In some embodiments, a given application may rely on the authenticity of multiple assertions and may either directly and/or indirectly query multiple ledgers. For example, a ledger may be indirectly queried when a ledger derivative is queried. In some embodiments, a ledger derivative may comprise one or more databases and/or ledgers derived from information recorded in one or more other ledgers.

A blockchain and/or other distributed ledger consistent with various disclosed embodiments may use a set of nodes, which in some embodiments may comprise full nodes and/or partial nodes. Full nodes may maintain a complete copy of the database and/or ledger. Partial nodes may have specialized capabilities and may store none and/or part of the database and/or ledger and/or an index thereof. Partial nodes may further maintain, for example, indexes, Bloom filters, shards, and/or other information generated based, at least in part, on associated databases and/or ledgers used in connection with various aspects of the disclosed embodiments.

In some embodiments, ledgers may be used to collect assertions and/or evidence of authority for a node that affirms such information, allowing multiple parties to cross check for compliance with policy. Ledgers may record the authentication information (e.g., a hash of the assertion) in public parts of the database and/or ledger. In certain instances, some applications may record the hash of encrypted information. Other applications, however, may record the hash of the information plaintext in a way such that access to the authentication information may be governed and/or may be modified (e.g., nullified). Access to unhashed plaintext information may be governed by applicable policies.

A candidate pool of submissions may be maintained comprising submissions that are not yet committed to the blockchain database and/or ledger. Various aspects of the disclosed embodiments may provide a mechanism for achieving consensus. For example, a byzantine consensus protocol ("BCP") may be used whereby various full nodes agree on a block of submissions to be written to the blockchain database and/or ledger. For example, each node may verify the a priori verifiable claims made by a submitter and/or determine other compliance with policy. A node may be chosen (or otherwise emerge) according to protocol to propose a next block of submissions, and other nodes may register agreement. When the BCP concludes a block is written, other nodes may update the database and/or ledger. A block may, for example, include one or more of a previous block header hash, a Merkle root of a hash tree of the submissions included in the block, and/or a time stamp for the block.

Certain implementations of the disclosed digital media integrity verification systems and methods may provide for a mechanism for reading and/or querying a trusted ledger. For example, a ledger may be indexed by a hash, fingerprint, and/or other mechanism of the subject public key in submissions to expedite an answer to a ledger query (e.g., "Tell me everything you know about a piece of digital media", "Has the digital media been modified following its original recording?", "Is the individual who created the digital media a professional journalist?", etc.). Some embodiments of the disclosed digital media integrity verification systems and methods may further provide for a subscription interface where one can subscribe to new assertions relating to digital content.

Certain embodiments disclosed herein provide for trusted services that may examine captured information recorded in one or more trusted databases and/or ledgers and generate information relating to associated content. For example, and without limitation a trusted service may crawl through image, audio, and/or video content on one or more web pages and/or other media and/or content, examine one or more trusted ledgers and/or databases to determine whether the content is associated with information recorded in the databases and/or ledgers, and/or generate and/or otherwise associate attribute information associated with the content based on the results of the examination. The attribute information may comprise, for example and without limitation, information relating to the provenance, origination, chain-of-handling, integrity, accuracy, and/or authenticity of the content.

In some embodiments, trusted content applications, such as a trusted browser application, may interact with trusted services and provide users with an indicia of any available attribute information associated with content they view and/or consume. For example, in certain embodiments, content viewed by a browser application may be rendered with an indication of integrity and/or authenticity corresponding to an associated result of a query to a trusted service. In further embodiments, a trusted content application may directly query one or more ledgers and/or derivative ledgers to determine content provenance, origination, chain-of-handling, integrity, accuracy, and/or authenticity. In this manner, embodiments of the disclosed systems and methods may provide users with an indicia of the integrity, authenticity, provenance, and/or other information associated with content they view using the application.

Content Information Recordation Using Trusted Ledgers

FIG. 1 illustrates a non-limiting example of an architecture for managing and/or otherwise verifying the integrity of digital content using a ledger 104 consistent with certain embodiments disclosed herein. In certain embodiments, the ledger 104 may be distributed in nature and shared by a number of parties with varied interests that may have a common emergent goal of maintaining accurate reporting of events reflected in digital media. Although various embodiments disclosed herein are described in connection with a ledger 104 that comprises a TIDAL for illustration and explanation purposes, it will be appreciated that other types of ledgers and/or databases in other suitable forms may also be used in connection with the disclosed embodiments, including ledgers and/or databases that are not necessarily distributed and/or public.

As illustrated, a content generation and/or processing system 102 may submit an assertion related to a piece of digital content 100 for recordation in the ledger 104. In some embodiments, the content generation and/or processing system 102, operating as an assertion submitter, may be an entity and/or system that possesses credentials indicating authority to submit assertions for consideration to be recorded in the ledger.

In certain embodiments, the content generation and/or processing system 102 may operate as a content generation and/or producing client and comprise a device and/or an application executing thereon configured to record and/or otherwise generate digital content (e.g., content 100) and/or generate a digitally signed record of the generation and/or creation of the digital content. In further embodiments, the content generation and/or processing system 102 may operate as an editing client. An editing client may transform, edit, and/or otherwise modify digital content such as, for example, a recording of an event. An editing client may also record what transformations and/or changes were performed to piece of digital content. Transformations and/or modifications to piece of digital content may include, for example, one or more of:

Cropping and/or removing portions. For example, a digital movie clip may be cropped to highlight a certain area of the clip.

Format changes. For example, a digital movie clip may be edited with respect to storage format to fit the flow of a stream that includes the movie clip. In another example, an audio recording can be rendered into a different format to save space and/or fit a rendering stream where the record is included.

Enhancements. For example, an audio recording may be enhanced to remove background noise.

In yet further embodiments, the content generation and/or processing system 102 may operate as an aggregation client. For example and without limitation, an aggregation client may aggregate two or more pieces of content, producing a derived piece of content.

Actions performed in connection with the piece of content 100 including, for example with without limitation, generation, creation, transformation, editing, processing, and/or modification, may be associated with a content assertion. In some embodiments, the content assertion may be generated by the content generation and/or processing system 102 performing the action. In further embodiments, the generation and/or processing system 102 may not perform the action itself, but may be configured to generate a content assertion consistent with various aspects of the disclosed embodiments based on and/or otherwise in response to another system and/or service performing an associated action on content 100. Consistent with embodiments disclosed herein, the generated assertion(s) may be submitted by the content generation and/or processing system 102 for inclusion in the ledger 104.

In some embodiments, an assertion may be generated based on a transformation of the subject associated data and/or information and/or portions thereof. For example and without limitation, an assertion may comprise a hash generated based on the content that is the subject of the assertion (e.g., a hash of the original content, transformed, processed, modified, and/or edited content, and/or the like, and/or combinations of the same). Other types of transformations are also contemplated. Thus it will be appreciated that various examples and embodiments of assertions described herein are provided for purposes of illustration and explanation, and not limitation.

In some embodiments, a submitted assertion may comprise an identifier associated with the content generation and/or processing system 102 that may be used by various ledger nodes 106 in connection with a verification and/or witnessing process to determine whether the content generation and/or processing system 102 has the requisite authority to make a submission of the specific type and/or with the scope reflected in the submitted assertion for inclusion in the ledger.

The submitted content assertion may be broadcast to various ledger nodes 106 that may, among other things, maintain and/or manage the ledger 104. In certain embodiments, at least a portion of ledger nodes 106 may be configured to verify submitted assertions prior to recordation of the assertions in the ledger 104. Consistent with various disclosed embodiments, content assertions may be entered into the ledger 104 upon the agreement of multiple ledger nodes 106 operating as witnesses and/or verifiers.

In some embodiments, a submitted assertion may comprise an identifier associated with the content generation and/or processing system 102 that may be used by various ledger nodes 104 in connection with a verification and/or witnessing process to determine whether the content generation and/or processing system 102 has the requisite authority to make a submission of the specific type and/or with the scope reflected in the submitted assertion for inclusion in the ledger 104.

The ledger nodes 106 may verify the authenticity of the authority of the content generation and/or processing system 102 to verify that the content generation and/or processing system is in fact authorized to make the assertion in accordance with one or more applicable policies. For example, the ledger nodes may verify that an identifier submitted with the assertion (e.g., an ID of the content generation and/or processing system, a public key, and/or the like) is valid and/or has not been revoked.

The ledger nodes 106, operating as witnesses, may verify a variety of information prior to recording a submitted assertion in the ledger 104. For example, the ledger nodes 106 may verify that an identifier submitted with the assertion (e.g., an ID of the content generation and/or processing system 102, a public key, and/or the like) is valid and/or has not been revoked. The ledger nodes 106 may further verify that the submitter's scope of authority includes authority over the subject of the assertion. In certain embodiments, this may involve verifying prior submissions regarding the content generation and/or processing system 102 included in the ledger 104.

In various embodiments, verified content assertions may be placed into a pool to be entered into the ledger 104, and when a threshold number of ledger nodes 106 operating as witness agree regarding the authenticity and/or the actual authority of the content generation and/or processing system to make the content assertion, the content assertion may be recorded in the ledger 104. In certain embodiments, this agreement may be reached in accordance with an applicable agreement policy using, for example and without limitation, a byzantine agreement protocol and/or another suitable protocol. Once agreement has been reached, the content assertion may be considered validated by the ledger nodes 106 and the submission may be recorded and/or otherwise entered into the ledger 104. In certain embodiments, the ledger nodes 106 may be configured to generate cryptographic links between entries in the ledger 104 (e.g., between blocks in a blockchain).

A user system 108 interested in verifying the credibility, authenticity, integrity, and/or provenance of digital content may query one or more of the ledger nodes 106 and/or other associated systems and receive associated responses that may provide information regarding the content has that been recorded in the ledger 104. Returned information may be used by the user system 108 to ascertain the credibility, authenticity, integrity, and/or provenance of the digital content 100. For example, the user system 108 may operate as a content consuming system configured to verify digital media by inspecting available certificates and/or ledger entries recording certain generation, modification, editing, transformation, chain-of-handling, and/or provenance information relating to digital content 100. In certain embodiments, a single system may operate as both a user system 108 and a content generation and/or processing system 102 and/or perform various functions and/or subsets of functions of the same.

A querying system 108 interested in determining whether an assertion and/or a certain type of assertion (e.g., an assertion relating to a particular device and/or the like) has been recorded in the ledger 104 may be configured to query one or more of the ledger nodes 106 and/or other associated systems and receive associated responses. In various embodiments, the querying system 108 may query a system 112 maintaining a ledger derivative 110 and may receive associated responses of assertions recording to the ledger derivative 110 and/or the ledger 104. In some embodiments and as illustrated, a derivative ledger node 112 may be a separate system from the one or more ledger nodes 106. In further embodiments, a single system may maintain both a ledger derivative 110 and a primary ledger 104.

As discussed above, in some embodiments, entries in the derivative ledger 110 may be generated based on entries and/or assertions recorded the ledger 104 and/or one or more other ledgers and/or information sources. In various embodiments, entries in the ledger derivative 110 may be generated and/or otherwise recorded by the derivative ledger node system 112 based on entries in the ledger 104 in accordance with one or more policies and/or algorithms governing entries in the ledger derivative 110, which may be dependent, at least in part, on a type, application, and/or use of the ledger derivative 110. Among other things, use of a ledger derivative 110 consistent with various aspects of the disclosed embodiments may help streamline the validation of current state of information from the ledger 104 by performing various processing and/or analysis of entries in the ledger 104, allowing for information queries with reduced latency and/or providing useful conclusions and/or derivative information from the more granular data recorded in the ledger 104

Content Information Assertions

In certain embodiments, content assertions submitted and/or otherwise recorded in a ledger, which may be referred in certain instances herein simply as an assertion, may comprise information reflecting one or more of the following sets of claims: (1) a set of a priori verifiable claims about the authority of the submitter to make the second set of record attestations and/or assertions and (2) one or more record attestations and/or assertions relating to the digital content, which may be referred to in certain instances herein more generally as a "fact." In many embodiments, an assertion may comprise both information relating to an authority of a submitted and a fact relating to a piece of digital content. In further embodiments, an assertion may more simply comprise a fact relating to the piece of content. As discussed in more detail below, certain assertions may not necessarily relate to digital content, but instead may be used to express trusted relationships between services, entities, systems, and/or parties which may be used in connection within a variety of trust models implemented with embodiments described herein and aspects thereof.

Assertions recorded in a ledger relating to digital content may comprise and/or otherwise be generated based on, for example and without limitation, one or more of:

A content hash, fingerprint, other identifier information, and/or a result of some other transformation performed on content. For example, in some embodiments, a fact component of a record assertion may be generated by hashing a digital content file and/or performing some type of transformation on the content file.

Content generation and/or processing system information. Content generation and/or processing system information may comprise, for example and without limitation, information identifying the system (e.g., a system identifier), an account (e.g., an account identifier), information identifying software used to generate, modify, transform, edit, etc. the content executing on the system, information identifying an associated user (e.g., a user identifier), identifiers of entities and/or services associated with the system, system capabilities and/or properties (e.g., secure hardware and/or software services providing an indicia of how information generated by the content generation and/or processing system may be trusted), any/or any information relating to the content generation and/or processing system and/or associated users, services, and/or entities. In certain embodiments, such information may be authenticatable and/or verifiable using one or more suitable methods, which in some implementations may involve interactions with authentication services.

Content creation, rights, and/or ownership information. In some embodiments, ownership and/or associated creative rights may by default be associated with a user, account, and/or entity associated with a content generation and/or processing system. In further embodiments, such ownership and/or other rights may be assigned to others.

Metadata relating to the digital content, which may comprise creation time, content length, duration, format, and/or other information relating to the content. In some embodiments, this may comprise an indication of a version and/or an integration of an associated piece of content.

Information associated with the veracity and/or endorsement of digital content. In some embodiments, a third-party operating a trusted authority may generate an assertion attesting to the veracity of digital content generated and/or otherwise authored by another party. For example and without limitation, a trusted authority on climate may hash and/or sign an attestation regarding a news article on climate change authored by another party with an indication that they have verified the facts, logic, and/or contents of the article and attest to its veracity. In another non-limiting example, a trusted authority may determine that an article includes incorrect facts, logic, and/or content, and may generating an attestation indicating as such.

Any other commentary, context, and/or other information associated with digital content generated at the time of the generation, recording, transformation, modification, editing, etc.

Consistent with embodiments disclosed herein, a content assertion may comprise an indication of an identity and/or authority of a submitter of the content assertion (e.g., an identity and/or authority associated with a content generation and/or processing system, an associated user, and/or the like). In some embodiments, such an indication may be in the form of a cryptographic and/or digital signature. In certain embodiments, the signature may be associated with a particular user of a content generation and/or processing system, the content generation and/or processing system itself, an associated content capturing and/or generation device (e.g., a camera, a microphone, and/or the like), an application executing on the content generation and/or processing system, and/or the like. For example, in at least one non-limiting example, a content assertion may comprise a hash of a content file and a verifiable and/or authenticatable digital signature on the hash of the content item generated using a private key of the content generation and/or processing system.

As noted above, the content assertion may comprise include an asserted fact. In some embodiments, the asserted fact may comprise a hash (e.g., a SHA256 hash) of a statement associated with content. For example, in some embodiments, a fact included in a content assertion may include a statement associating a hash of a photo and/or video file with a camera (e.g., a particular camera, a camera model type, and/or the like). In certain embodiments, a fact may comprise a hash of a JavaScript Object Notation ("JSON") structure that describes a relationship between a content actor (e.g., a content generation and/or processing system) with content. In further embodiments, the content assertion may comprise a hash of a JSON structure that may be constructed by an assertion submitter and be used to verify a fact. In certain embodiments, a content assertion may further include a state which may comprise a generalized assertion signifying whether an associated assertion is "true" or "false."

It will be appreciated that assertions relating to digital content may comprise a variety of types of information and/or be structured in a variety of ways consistent with various aspects of the embodiments disclosed herein. Indeed, any suitable type of information relating to content and/or systems, entities, and/or services that interact with content may be used in connection with various aspects of the disclosed systems and methods, which may in some circumstances depend, at least in part, on a particular application, content, and/or paradigm in which embodiments described herein are applied.

Trusted Content Information Service

Certain embodiments disclosed herein provide for a trusted service that may examine digital content and information stored in connection with one or more trusted ledgers with content assertions associated with the examined content. For example, in some embodiments, a trusted service may crawl through image and/or video content on or more webpages and/or other content sources (e.g., libraries of content, etc.). The trusted service may examine one or more trusted ledgers and/or databases recording various content assertions (e.g., by querying the trusted ledgers) to determine whether the image and/or video content is associated with information recorded in the databases and/or ledgers. Based on the examination of the trusted ledgers and/or databases, the trusted service may generate and/or otherwise associate attribute information with the image and/or video content. The attribute information may comprise, for example and without limitation, information relating to the provenance, origination, chain-of-handling, integrity, accuracy, and/or authenticity of the content. Attribute information may be stored and/or otherwise associated with, for example and without limitation, the examined content itself, in one or more databases associated with the trusted service, and/or in one or more ledgers, which may operate as derivative ledgers.

Figure 2:
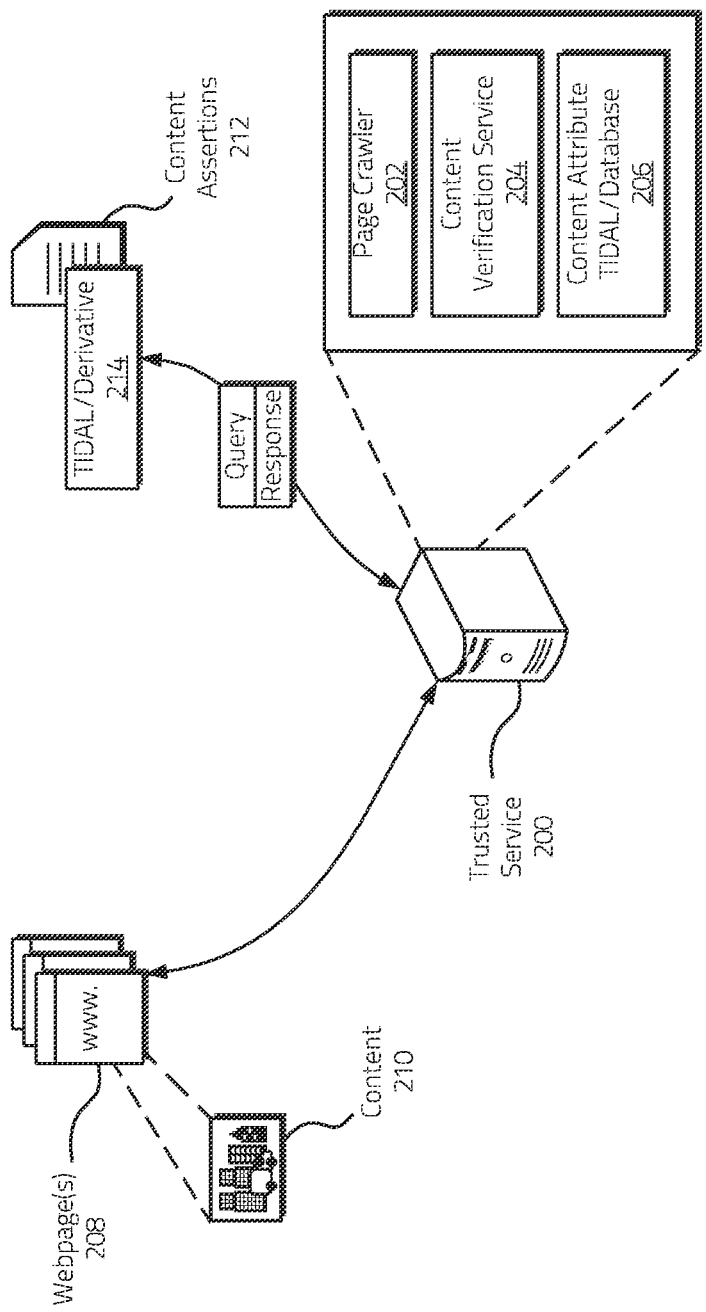
FIG. 2 illustrates a non-limiting example of a trusted service configured to generate and/or associate attribute information with content consistent with certain embodiments disclosed herein.

FIG. 2 illustrates a non-limiting example of a trusted service 200 configured to generate and/or associate attribute information with content 210 consistent with certain embodiments disclosed herein. In the illustrated embodiments, for the purposes of explanation, the trusted service 200 is described as being configured to examine content 210 (which may comprise a plurality of content items but is shown as a single content item in the interest of clarity and simplification) included in one or more webpages 208. It will be appreciated, however, that various aspects of the disclosed embodiments may be used in connection with examining and associating attribute information with a variety of types of content and/or associated content sources and/or libraries (e.g., content libraries that are not a set of webpages).

Consistent with embodiments disclosed herein, a page crawling module 202 executing on the trusted service 200 may crawl through one or more webpages 208 and identify associated content 210. The content 210 may comprise, for example and without limitation, one or more of visual content such as images and/or video, audio content, text content, any other type of content, and/or any combination of the same.

A content verification service 204 of the trusted service 200 may query one or more TIDALs, TIDAL derivatives, and/or other databases 214 and/or ledgers to identify whether the ledgers include one or more one or more assertions associated with the identified content 210. Although the trusted service 200 is shown as issuing queries and receiving responses from a single ledger 214, which may comprise a TIDAL and/or a derivative TIDAL, it will be appreciated that in further embodiments, the trusted service 200 may interact with a variety of TIDALs and/or ledgers in connection with implementing aspects of the embodiments disclosed herein.

In certain embodiments, queries issued by the trusted service 200 to the ledger 214 and/or an associated system and/or service may be generated, at least in part, based on the identified content 210. In certain embodiments, the issued queries may be structured as a query to determine whether a particular assertion and/or other information generated based on the content 210 is included in the ledger 214, which may be generally described in certain instances herein as a candidate assertion. Responses may be issued from the ledger 214 and/or an associated system and/or service indicating whether or not the queried assertion and/or information is recorded in the ledger 214. For example and without limitation, in at least one implementation, the trusted service 200 may generate a hash based on a file of the content 210. The trusted service 200 may issue a query that comprises the hash to the ledger 214 to determine whether the hash of the content 210 has been recorded in the ledger 214.

It will be appreciated that the semantic structure of entries in the ledger 214 and/or candidate assertions included in queries issued to the ledger 214 by the trusted service 200 may employ a variety of suitable structures and/or include a variety of information, which may depend on a particular application and/or context, and that the examples presented herein are to be considered as illustrative and non-limiting. In some embodiments, there may be a shared protocol, format, and/or structure between the trusted service 200 and/or the ledger 214 for generating candidate assertions for verification with the ledger 214. In further embodiments, the trusted service 200 may not immediately be aware of the protocol, format, and/or method for generating candidate assertions, but may receive such information from the a service and/or system maintaining the ledger 214 (e.g., during an initialization and/or handshake process where details regarding how the trusted service 200 should generate candidate assertions submitted to the ledger 214 for verification and/or the constituent information that should be used to generate such candidate assertions is shown In response to issued queries, the trusted ledger 214 (and/or a system and/or service managing the ledger 214 and/or otherwise associated with the ledger 214) may issue responses indicating whether or not candidate assertions included in queries issued by the trusted service 200 are included in the ledger 214. Based on the received responses, the trusted service 200 may associate and/or otherwise tag the content 210 with one or more attributes and/or indications.

In some embodiments, the attribute and/or indication information may be directly associated with the content. For example, the trusted service 200 may communicate with one or more systems and/or services hosting the content 210 and/or associated webpages 208 to update metadata associated with the content 210 to include attributes and/or indications generated by the trusted service 200 based on a ledger query. In certain embodiments, the attributes and/or indications associated with the content 210 may be included in a content validation database and/or ledger 206, which may comprise a TIDAL and/or a TIDAL derivative. In some embodiments, the database and/or ledger 206 storing content tag and/or attribute information may be maintained by and/or otherwise directly associated with the trusted service 200. In further embodiments, the database and/or ledger may be maintained by a separate system and/or service in communication with the trusted service 200.

In at least one non-limiting example, a page crawling module 202 of the trusted service 200 may identify video content 210 included on a webpage 208. The content verification service 204 may query one or more TIDALs, TIDAL derivatives, and/or other databases and/or ledgers 214 to identify whether the ledgers 214 include one or more one or more assertions 212 associated with the identified video content. Based on any identified assertions, the trusted service 200 may associate attribute and/or indication information associated with the video content 210. For example, the content verification service 204 may associate and/or otherwise tag attribute and/or indication information with the video content 210 indicating whether or not the examined ledgers 214 include one or more assertions indicating whether the content 210 is authentic and/or has not been modified, transformed, and/or otherwise processed. This attribute and/or indication information may be associated directly with the content 210 and/or may be included in a database 206, which may comprise a TIDAL, associating content with tag and/or attribute information.

Trusted Content Playback

Figure 3:
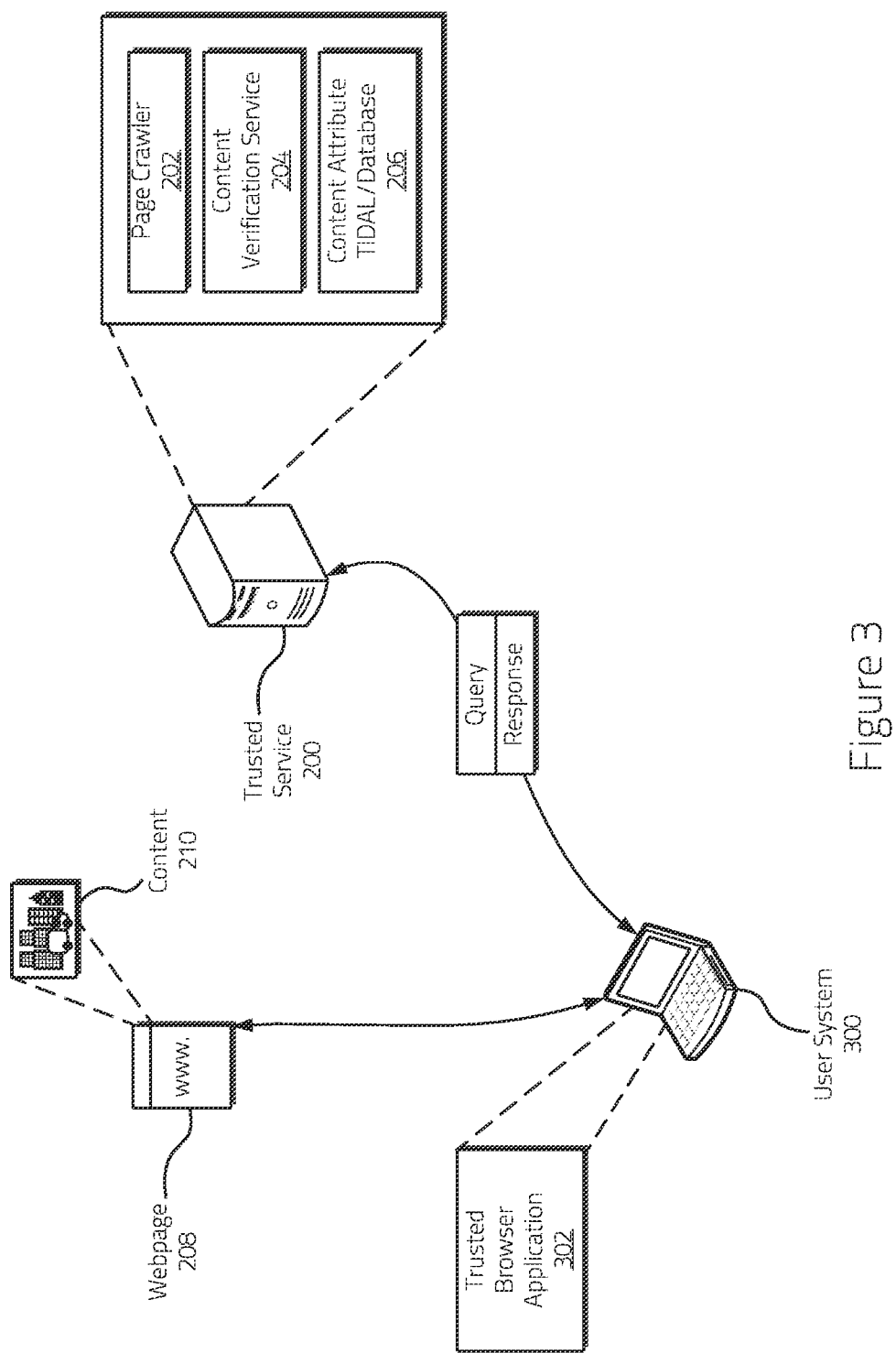
FIG. 3 illustrates a non-limiting example of interactions by a trusted application consistent with certain embodiments disclosed herein.

FIG. 3 illustrates a non-limiting example of interactions by a trusted application 302 executing on a user system 300 consistent with certain embodiments disclosed herein. Consistent with various embodiments disclosed herein, a trusted application 302 executing on a user system 300 may be used to access, view, playback, browse, and/or otherwise use content 210. For example and without limitation, a trusted internet browser application 302 may be used to access content 210 included in one or more webpages 208.

When the trusted application 302 accesses content 210, it may query the trusted service 200 to determine whether the content 210 is associated with validated and/or otherwise verified tag, attribute, and/or other information. For example and without limitation, in some embodiments, the query may request a responsive indication from the trusted service 200 regarding whether the content 210 is authentic, has been modified, transformed, and/or otherwise processed from its original form.

The query may comprise a variety of information identifying and/or otherwise associated with the content 210. For example, in some embodiments, the query may comprise metadata and/or another identifier associated with the content 210 which may be accessible by the trusted application 302 and/or user system 300. In further embodiments, the query may comprise a fingerprint and/or other identifier generated based on the content 210. For example and without limitation, in some embodiments, a hash may be calculated based on a file for the content 210, which may correspond with and/or otherwise be used to identify information included in the trusted ledger 206.

In certain embodiments, the trusted service 200 (and/or a content verification service 204 associated with and/or executing on the trusted service 200) may examine one or more trusted ledgers 206 and/or databases to determine whether the ledgers 206 and/or databases include one or more entries (e.g., attribute and/or tag information) and/or other information associated with the content 210. For example and without limitation, the trusted service 200 may determine whether a hash of image and/or video content included in a query is recorded in the ledger 206 maintained by the trusted service 200. In certain embodiments, the attribute information may comprise, for example and without limitation, information relating to the provenance, origination, chain-of-handling, integrity, accuracy, and/or authenticity of the content 210.

A response may be generated by the trusted service 200 (and/or the content verification service 204 executing thereon) and communicated to the user system. In some embodiments, the response may comprise tag, attribute, and/or other information associated with the content based on information accessed from the examined databases and/or ledgers 206. For example and without limitation, in some embodiments, if certain information is recorded in the trusted database and/or ledger 206, the response may comprise a "yes" or a "no," which may be understood by the trusted application 302 executing on the user system 300 that the content 210 is associated with a certain provenance, origination, chain-of-handling-integrity, accuracy, authenticity, and/or the like. In further embodiments, the response may comprise information delineating in more detail an indication of the provenance, response origination, chain-of-handling, integrity, accuracy, and/or authenticity of the content 210.

In further embodiments, content 210 may be pre-tagged with attributes, tags, and/or other information relating to the provenance, response origination, chain-of-handling, integrity, accuracy, and/or authenticity of the content by the trusted service 200. For example, the trusted service 200 (and/or another service) may securely associate attribute, tag, and/or other information with the content 210. In some embodiments, the attribute, tag, and/or other information may be hosted with the website 208 and/or the content 210. When accessing the content 210, the secure application 302 executing on the user system 300 may access the attribute, tag, and/or other information associated with the content 210.

Figure 4A:
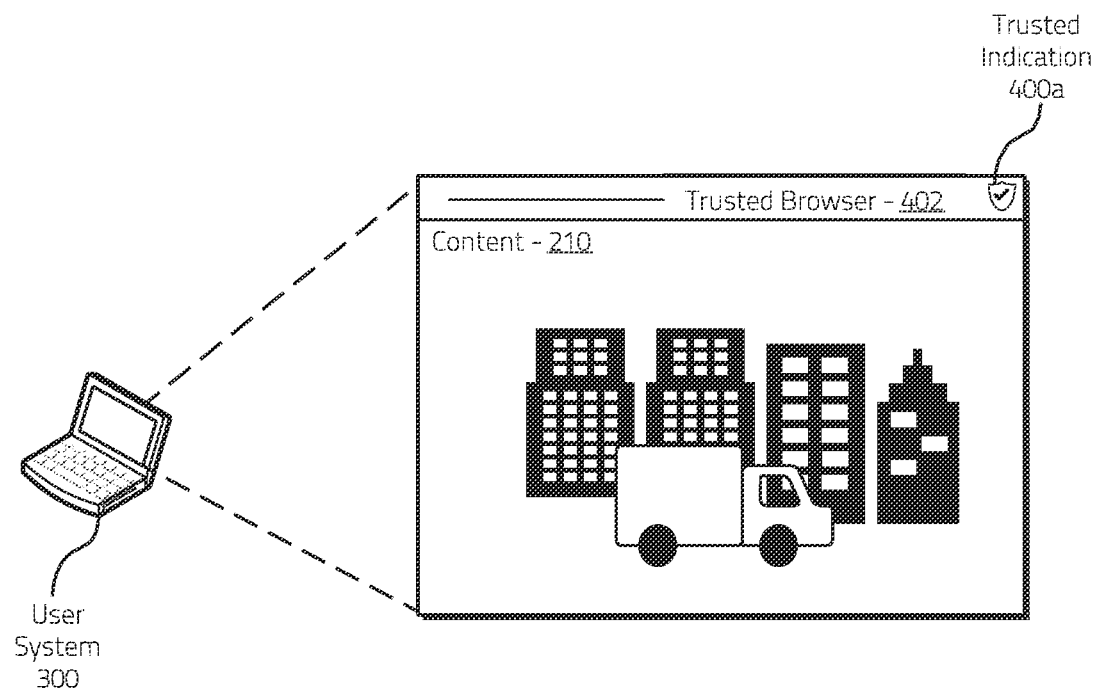
FIG. 4a illustrates a non-limiting example of displaying content with a first indication of integrity consistent with certain embodiments disclosed herein.
Figure 4B:
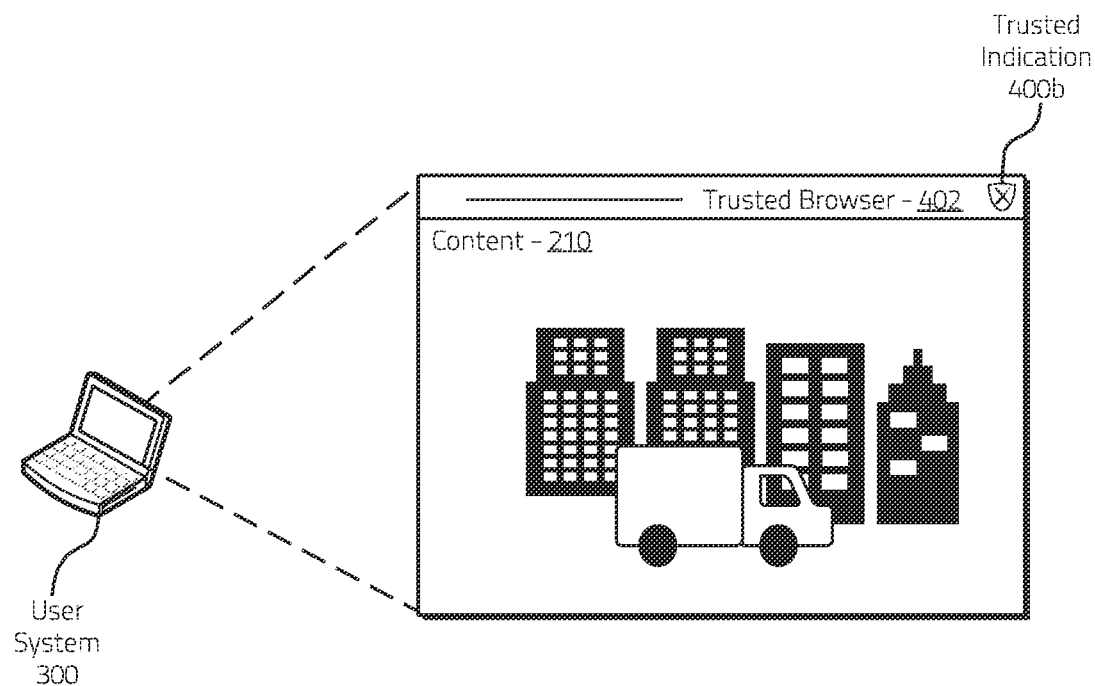
FIG. 4b illustrates a non-limiting example of displaying content with a second indication of integrity consistent with certain embodiments disclosed herein.

Consistent with various embodiments disclosed herein, and as discussed in more detail below in connection with FIG. 4a and FIG. 4b, the content 210 may be rendered by the trusted application 302 (e.g., rendered as part of the webpage 208) in connection with an indication relating to the attribute, tag, and/or other information associated with the content 210. In this manner, a user may be able to ascertain certain information relating to the content 210 based on the response provided by the trusted service 200 and/or information directly associated with and/or otherwise tagged in the content 210.

Trusted Application Interfaces and Content Verification Indications

As illustrated in connection with FIG. 4a and FIG. 4b, a trusted application interface 402 such as, for example and without limitation, a trusted web browser interface, may display content with indicia 400a, 400b of the provenance, response origination, chain-of-handling, integrity, accuracy, and/or authenticity of the content based on information included in the attribute, tag, and/or other information associated with the content. For example, as illustrated in FIG. 4a, if it is determined the tag, attribute, and/or other information indicates that the associated content 210 is authentic and/or otherwise verified, the content 210 may be rendered by a trusted browser interface 402 with a first indication 400a of authenticity and/or validity. Similarly, as illustrated in FIG. 4b, if it is determined the tag, attribute, and/or other information indicates that the associated content 210 is not authentic and/or otherwise verified, the content 210 may be rendered by the trusted browser interface 402 with a second indication 400b of authenticity and/or validity.

In a further non-limiting example, if some portions of a webpage are validated and others are not (e.g., certain webpage content is validated), a suitable indication such as an outline of a certain color, shading, and/or some other suitable audio, video, and/or image indication may be rendered in association with validated and/or not validated content to indicate verification and/or provenance status. It will be appreciated that a variety of indications and/or indicia may be rendered by a trusted browser interface 402 in connection with validated and/or not validated content, and that any suitable indication and/or indicia and/or combinations thereof may be used in connection with the disclosed embodiments.

In an additional non-limiting example, various embodiments of the disclosed systems and methods may be used to provide indications of the veracity of content. For example, when an interface cursor moves over a validated portion of content within the trusted browser interface 402, additional information may be shown to the user such as, for example, an indicia of the veracity of the portion of content and/or the source of the associated veracity statements.

TRUSTED CONTENT VERIFICATION SERVICE EXAMPLES

Embodiments of the disclosed systems and methods may be implemented, described, and/or understood in connection with various non-limiting examples, including one or more of the following:

Example—Trusted Web Browser

When users are confronted with information on the Internet, be it in the form of a rendered page of HTML, and/or similar web-based languages, or an audio and/or video stream, it may be difficult to find the provenance of the displayed information. Embodiments of the disclosed systems and methods may be used in connection with a trusted web browser configured to trace provenance of information. Provenance may relate to an origin of information itself and/or an origin of annotations and/or other comments in connection with information. For example, information relating to an annotation may be traced to a point in time when the annotation was created and/or to an author of the annotation.

Certain embodiments disclosed herein may use logical entities operating as evidence broker services. An evidence broker service may comprise a trusted service that provides provable assertions from a recognized authority. In at least one non-limiting example, an evidence broker service may comprise a collection of well known, publicly traded companies that have installed trusted software in their products that report events to a server and/or set of servers run jointly by the companies. For example, a group of camera producers may join forces to form an evidence broker service. The camera producers may add a trusted component into their cameras that will create a digitally signed record on at least one of the servers belonging to the evidence broker service. When a user takes a picture, the camera may capture available information about the picture and may send the signed (and possibly encrypted information) along with a hash of the picture to the evidence broker service as an assertion. The evidence broker can then make the information available to the public and/or to a group of people selected by some suitable means (for instance, membership in a picture aficionado group).

An annotation broker service may provide annotations to an assertion. The annotations may themselves be represented as assertions but may be generated indirectly such as by human and/or automatic curation of associated facts and/or evidence. Annotations may be provided by an annotation broker and/or by different annotation brokers. Annotations can be associated with tags and/or meta-data that may help the trusted web browser to choose among the annotations.

In at least one non-limiting example, a user may sit down to enjoy a nature program on Channel A via a trusted browser application. Segments in the nature program may be associated with provenance assertions indicating associated video content was produced by News Network B, which the user may find irreputable. The user may set a policy in their browser indicating that any content originating from News Network B should be excluded from being rendered or be marked with an indication of nefarious provenance. In another more general non-limiting example, a user may set a policy that a trusted application should not show content that is not trusted (e.g., content that is not verifiable through a ledger and/or TIDAL query), and/or only display untrusted content with a watermark and/or other indicia of trust in connection with the content.

In another non-limiting example, a user may access content via a trusted browser. The browser may provide an indication showing that there is annotation information and/or other information relating to the displayed content available. The user may then access this information via the browser to better understand the nature of the content they are viewing.

In some embodiments, a trusted browser application may comprise a scanner that reads an input stream of content and/or other information, a set of policies that selects among subscribed and/or available services based on some criteria, a set of rules for how to communicate information relating to content to a user, and/or a rendering unit, which may or may not necessarily be part of the unit rendering the input stream, and/or the like.

The scanner may read the input stream (e.g., a video stream). In at least one example, the scanner may examine video content files and/or subsets thereof and hash them to provide a hash to look up via one or more trusted services. Another example may be a scanner that uses voice recognition to pick out phrases in an audio stream for lookup in subscription services. In a further example, a scanner may use image recognition (e.g., still images and/or moving images) to create a unique token to use as a lookup with the trusted service. A scanner may further use text recognition methods to determine meaning and/or context of a piece of text and/or to create a token unique to that context and/or meaning for use as a lookup with a trusted service. Depending on the input stream, different scanners may be selected to read all and/or parts of the stream. In some embodiments, scanners may be provided to the trusted browser by one or more trusted services and/or content providers.

In some embodiments, trusted services, which may be referred to in certain instances herein as trusted subscription services and/or subscription services, may be organized around certain groupings of interests—for instance, industry groups that may provide data about some event or product or activity. For example, a camera may comprise a trusted component that may send data about a picture taken by the camera to a subscription service. A producer of image editing software may send data to a subscription service that may bind an edited image to the original image and may also make clear what procedures have been used in the rendering of the new image.

In another example, a producer of a song lyrics may register a hash of the text of the lyrics to a subscription service dedicated to music. When music is later added to the lyrics, the musician may link a recording back to the original text and may register this with the service. When a soda company uses the recording track in a commercial, the sound editing software may add the back links to the earlier iterations of the work and/or information relating to the transformations done to the work.

A trusted browser may also comprise a set of policies that select a subscription service in connection with content verification and/or validation depending on some context. For example and without limitation, if a news video stream is displayed on a family rendering device (e.g., a TV), the policy may dictate that an "explicit content annotation" service would not be accessible before a certain time in the evening. A policy may express relevant primitives for choosing a subscription. Policies can be provided by a third party and/or constructed by a user and/or parameterized by a user from a template provided by a third party.

As discussed above, indicators may be used in connection with a trusted browser and/or content rendering application to alert a user to the fact that some annotation, validity information, and/or provenance of viewed content has been detected. A variety of suitable indicators may be used, and indicators may be controlled by policy and/or some API.

A rendering unit for a trusted browser may comprise the same rendering unit used to evaluate an information stream but may also be a different rendering unit in further embodiments. When a same rendering unit is employed, like a browser on a computer display, the trusted browser can either be a separate window, a pop-up window, and/or an integral part of the trusted browser. The rendering unit may also be separate from the content rendering unit. For example, a user can use a smartphone as a rendering unit for a trusted browser while a computer may be used for the rendering of content. There can be several rendering units displaying trusted browser renderings according to the capabilities of different devices.

Example—Time Synchronized Annotations

In various embodiments, streams of information may be subject to verification. For example, a video stream may be subject to provenance verification. In some cases, information streams can be of verified provenance, but the views expressed within, and the evidence provided can be of questionable quality. Embodiments disclosed herein may provide one or more tracking streams with references into the original stream and references to the provenance and evaluation of the views expressed and the evidence provided.

Streams may be compiled and/or provided by service organizations. In some sense, these streams may be similar to "Directors Comments" associated with film or TV content. You can see a movie with the comments of the producing team overlaid on an audio channel.

The tracking annotation itself may be published with a link to information it tracks. This may be via a URL, a hash of the original video, and/or a hash or other reference to one of the origins of that video. For instance, if a video has been produced by editing another video, the tracking annotation can be bound to both videos. The tracking annotations may comprise references to portions of the information stream. The references can be time stamps, hashes to particular segments, and/or other indicators to reference segments of the stream.

A device rendering the tracking annotation does not have to be the same device as the device that renders the original stream. For instance, tracking annotations can be rendered in the form of an audio stream on a cell phone while the family television renders to original video. The mechanism that makes it possible for one rendering device to render a tracking annotation stream to another stream may be referred to as "pairing." Pairing may bind one or more tracking annotation devices to one or more original rendering devices. These devices may then communicate to support each other with information about the original stream and/or the annotation stream.

In the above manner, a trusted browser may further display and/or provide links to simulcast commentary or veracity annotations that are time synced to various points without continuous content. In some embodiments, this may further extend sideloaded metadata associated with accessed content. That is, instead of just indicating the provenance status concurrent with rendered content, these status indicators may also include supplemental information (e.g., simulcast supplemental information automatically played concurrently with, paused, and inserted temporarily or within, or overlaid in part on top of the original content) and/or links to supplemental information.

Example—Trusted Browsers and Veracity Indicators

Various embodiments disclosed herein may provide an architecture for measuring the veracity of a statement and/or information encounter when browsing electronic media. In certain embodiments, the systems and/or methods may be customized for veracity checking specific fields of information and/or used as a general information vetting tool.

In various embodiments, a trusted browser may comprise an indication, which may operate to provide information relating to the veracity of a statement or a collection of statements. For example, the indication may tell a user if a statement or a collection of statements have been debunked, or if the statement is regarding as false to some degree, through polling of one or more trusted services recording veracity information. The architecture may comprise a veracity determination system, whereby statements may be ingested and polled against one or more trusted services operating as veracity brokers for information and/or for computing an estimate of a degree of falseness. Trusted services operating as veracity brokers may provide historic data, proof of falsehood, initial estimates of falseness, and/or the like relative to one or more statements. In some embodiments, audit capabilities may further be provided by the architecture.

In some embodiments, a veracity indicator may provide a user with a relatively simple and/or easy to understand summary of how false the statements processed are. This indicator can be in the form of, for example and without limitation, a number, a color code, an animation or picture, text, a sound, a jingle, and/or any other suitable type of indicator. The veracity indicator may serve as a relatively quick and easily accessible warning, similar to the "pad lock" that some browsers use to indicate certificate and/or security status for a website.

The determination system may be configured to assess the falseness and/or a degree of falseness of a statement. A variety of AI techniques may be employed to train systems of software to extract pertinent information and/or to evaluation the information available to produce a determination of falseness. The determination system may also be connected via a network to other determination systems that may provide estimates. These systems may act alone and/or in a coordinated manner to provide a falseness estimate. Updates to the determination system can be provided dynamically via subscription, parameterized by a user as they see fit.

An audit facility may be used as a tool to understand the basis behind a displayed veracity indication. It may follow one or more steps in the veracity determination process. This may allow a user to determine if a result that does not appear to be correct can be tracked back to one or more brokers, a determination system, and/or local parameterization. A user may remedy an incorrect veracity indication by holding the veracity and/or determination providers accountable and/or adjusting the local parameters.

In at least one non-limiting example, a user may view news content of suspicious veracity via a news browser and be presented with a flashing red veracity indicator. The user may select the audit facility via the browser to see why the news content has been marked with a relatively low veracity score and discover that the images presented in the news content do not have a traceable provenance and that the reporter associated with the content has been flagged for peddling misinformation. In response, the user may adjust their browser settings to only view content having a threshold level of veracity/integrity.

Example—Integrity Verification and Tracking

Users may often find that certain claims found on the Internet may be of questionable quality. Embodiments of the disclosed systems and methods may provide mechanisms for tracking changes of veracity and/or falseness over time for a given subject. As a story develops and gets reported on the Internet, some of the falseness evaluations of any facts underpinning the story may change as more information becomes available. In some embodiments, veracity and/or integrity verification tools may allow the user to mark an article and/or a section of an article and/or other content for continuous review, and to set a policy for when the tool should bring any change to the attention of the user.

In certain embodiments, an indication and/or dashboard within a browser may alert a user of changes and/or new evaluations of facts underpinning news content and/or associated statements. The browser may further allow for viewing changes in veracity and/or integrity evaluations to allow a user to pinpoint what occurred that caused the changes and/or updated evaluations.

Example—Trust Indicators

As discussed above, a variety of indicators may be used to provide indications and/or information relating to integrity, authenticity, and/or provenance of content they view using the trusted browsers. Such trust indicators may, in some embodiments, display a level of trust that can be assigned to an information stream by changing some property and/or item displayed on a rendering device and/or browser, and/or any device associated with the rendering device, and/or changing the flow of the information stream. Trust indicators may comprise, for example and without limitation:

- An LED, lamp, and/or other visual indicator that signals the level of trust in a stream of information by changing color and/or blinking frequency in concern with the amount of trust that can be assigned to the information stream. In some embodiments, the LED can be attached to a rendering device. It may, in further embodiments, be attached to the auxiliary devices supporting the rendering device. In certain embodiments, it may be virtualized in the form of a bitmap representing an LED and/or a similar visual indicator.
- An icon, stationary or moving/animated, indicating the level of trust that can be assigned to the information stream.
- A sound that is separate from the normal sound of the information stream, such as a buzzer attached to the rendering device. Or a sound inserted into the stream indicating the level of trust to assign to the information stream.
- A sound in the form of a spoken word indicating the trust that can be assigned to the information stream.
- A vibrating device indicating the level of trust that can be assigned to the information stream.
- The change of properties of a display device such as manipulating the color space for a background of a picture in accordance with the level of trust that can be assigned to the information stream.
- Change in rendering properties such as tilt angle, rotation, and/or other display properties.
- Change in pitch and/or rendering voice of a spoken audio stream.

In some embodiments, indicators may be provided on adjacent devices. An adjacent indicator device may be a device that tracks an information stream and/or its associated claims stream. The adjacent indicator device may comprise, for example and without limitation:

- A cell phone that acts as an indicator device for a different rendering device. The cell phone may track the information stream on the rendering device and displays the trust indicator.
- A digital twin device located in some cloud where the twin device also can display the trust indicator.
- A device that has been paired with the rendering device for the purpose of displaying the trust indicator for the rendering devices current information stream.
- A home server for displaying the trust indicator.

Figure 5:
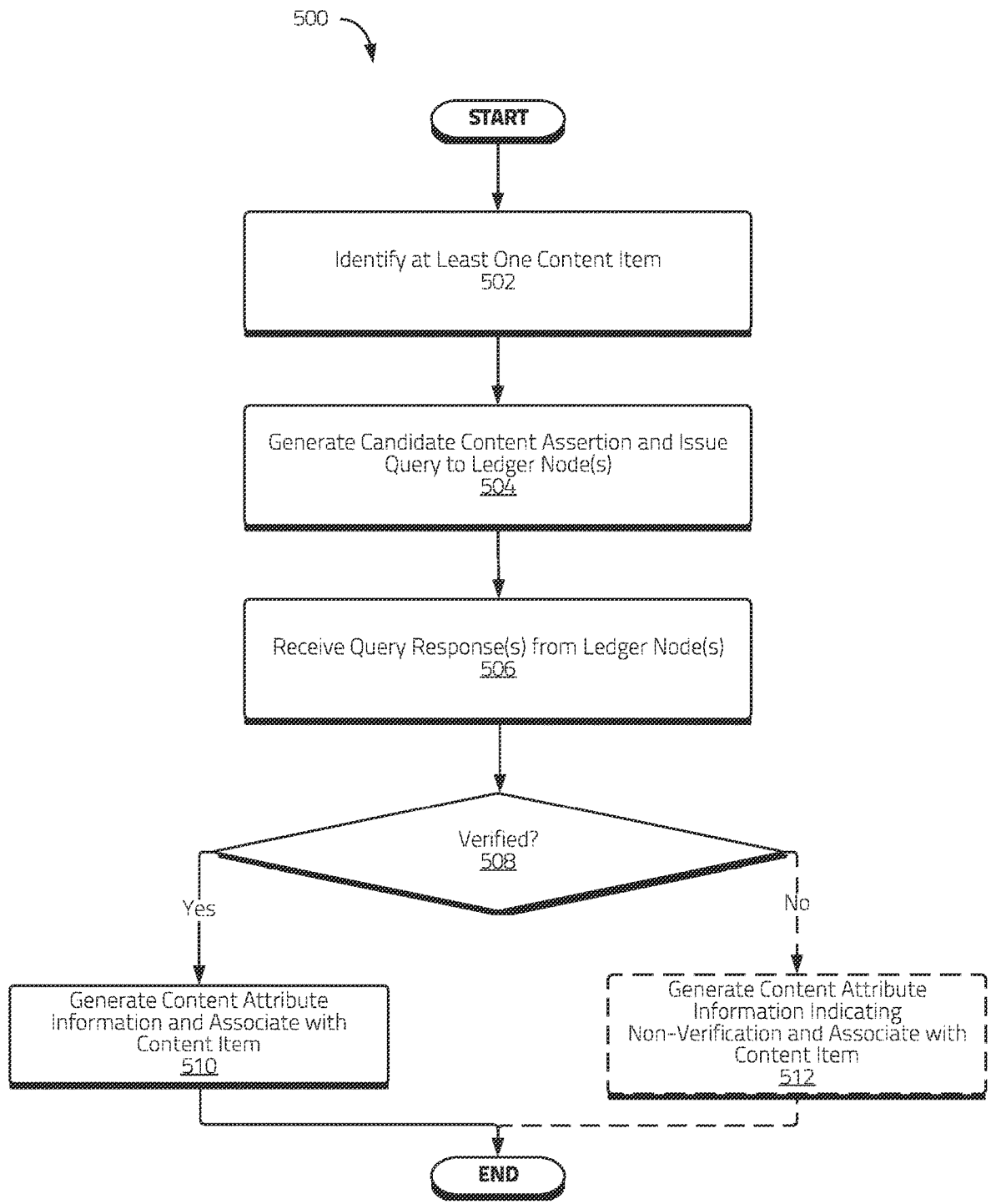
FIG. 5 illustrates a flow chart of a non-limiting example of a method for validating content and generating associated attribute information consistent with certain embodiments of the present disclosure.

FIG. 5 illustrates a flow chart of a non-limiting example of a method 500 for validating content and generating associated attribute information consistent with certain embodiments of the present disclosure. The illustrated method 500 may be implemented in a variety of ways, including using software, firmware, hardware, and/or any combination thereof. In certain embodiments, various aspects of the method 500, its constituent steps, and/or related functionality may be performed by service, system, and/or device associated with a trusted service, a user system, a content generation and/or processing system, one or more ledger nodes and/or derivative ledger nodes, and/or any other suitable application, device, system and/or service or combination of applications, devices, systems, and/or services.

At 502, a crawler service executing on a trusted service system may identify at least one content item included in a content library. In some embodiments, the content library may comprise a plurality of webpages. The crawler service may be configured to identify a number of different types of content items included in an examined library. For example and without limitation, the identified at least one content item may comprise at least one of audio content, video content, image content, and text content.

Based on the at least one content item, a candidate content assertion may be generated at 504. The candidate content assertion may be generated in some embodiments by performing at least one transformation operation on the at least one content item (e.g., a hashing operation). A content query comprising the candidate content assertion may be issued to one or more trusted content assertion ledger nodes maintaining at least a first trusted ledger.

At least one query response may be received from the one or more trusted content assertion ledger nodes at 506. Based on the received response, it may be determined at 508 whether the first trusted ledger maintained by the one or more trusted content assertion nodes comprises an indication that the candidate content assertion is recorded in the ledger. If the candidate content assertion is recorded in the ledger, content attribute information may be generated at 510 based on the received query response and associated with the at least one content item.

In certain embodiments, the content attribute information may comprise one or more of an indication of an integrity of the at least one content item, and indication of an authenticity of the at least one content item, and an indication of a provenance of the at least one content item. In further embodiments, the content attribute information may comprise an identifier of the at least one content item, which in certain implementations may comprise a hash of the content item. The generated attribute information may be stored, for example and without limitation, in metadata associated with the at least one content item and/or within a database and/or ledger (e.g., a TIDAL and/or derivative TIDAL) that may be managed by the trusted service system and/or a separate service (e.g., a remote service).

As noted above, in some embodiments, content attribute information may be generated and associated with content at 510 when a received query response indicates that the candidate content assertion is recorded in the ledger. In some circumstances, a query response may indicate that a candidate content assertion is not recorded in the ledger. Under such circumstances, in further embodiments, the method 500 may optionally proceed to 512, where content attribute information may be generated and associated with content indicating that the content has not been validated and/or otherwise authenticated with the trusted service.

Figure 6:
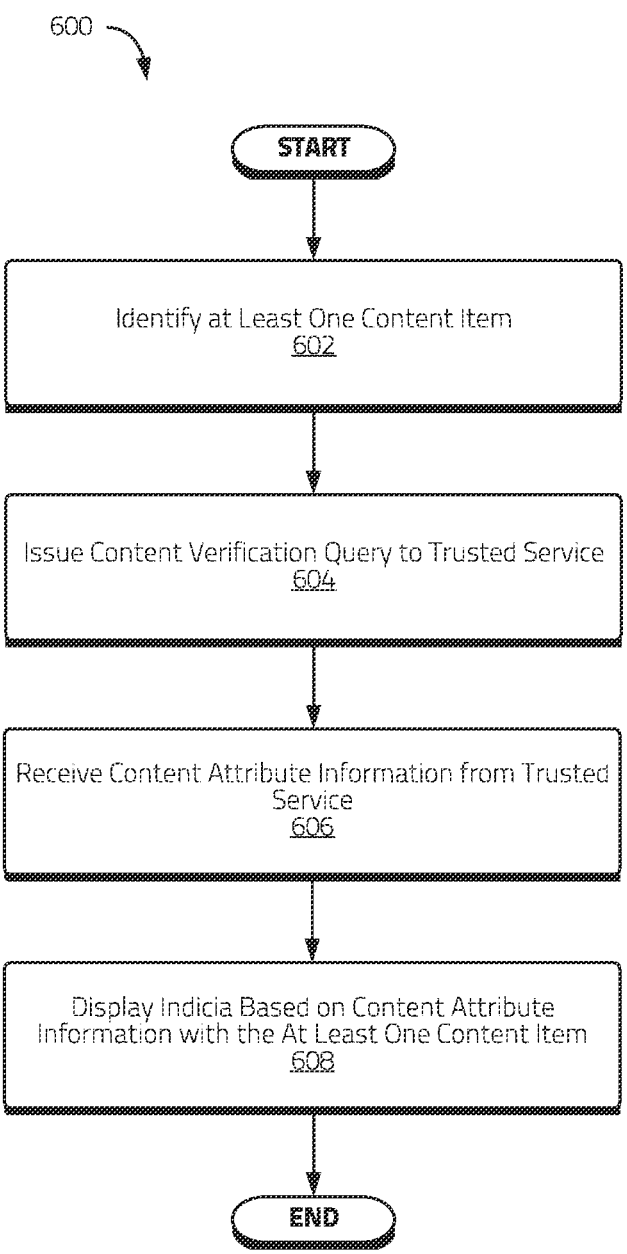
FIG. 6 illustrates a flow chart of a non-limiting example of a method for validating content with a trusted service consistent with certain embodiments of the present disclosure

FIG. 6 illustrates a flow chart of a non-limiting example of a method 600 for validating content with a trusted service consistent with certain embodiments of the present disclosure. The illustrated method 600 may be implemented in a variety of ways, including using software, firmware, hardware, and/or any combination thereof. In certain embodiments, various aspects of the method 600, its constituent steps, and/or related functionality may be performed by service, system, and/or device associated with a trusted service, a user system, a content generation and/or processing system, one or more ledger nodes and/or derivative ledger nodes, and/or any other suitable application, device, system and/or service or combination of applications, devices, systems, and/or services.

At 602, a trusted application executing on a user system may identify at least one content item. For example, in some embodiments, the trusted application may comprise a trusted web browser application, and the at least one content item may comprise a content item included in a webpage.

A content verification query may be issued by the trusted application to a trusted service at 604. In various embodiments, the content verification query may comprise an identifier associated with the content item. For example and without limitation, in some embodiments, the content verification query may comprise a hash of the content item, although other suitable types of content identifiers may also be used.

At 606, content attribute information may be received from the trusted service in response to the content verification query. In certain embodiments, the content attribute information may comprise one or more of an indication of an integrity of the at least one content item, and indication of an authenticity of the at least one content item, and an indication of a provenance of the at least one content item. In further embodiments, the content attribute information may comprise an identifier of the at least one content item, which in certain implementations may comprise a hash of the content item. Based on the received content attribute information, the trusted application may output an associated indication at 608 in connection with content playback (e.g., display an indicia generally based on the content attribution information visually, play an associated audible indication, and/or the like).

Trust Brokers

Various embodiments of the disclosed systems and methods detailed herein describe interactions between trusted applications and trusted services that may associate and, in some implementations, securely bind content attributes to content based on verification checks performed using a trusted ledger. This may allow a trusted application to, among other things, provide an indicia of the existence of verified attributes when rendering the content. For example and without limitation, an indicia provenance (e.g., the author/origin of the media) may be rendered in connection with rendering content via a trusted application. Further embodiments disclosed herein may permit the trusted establishment of associations between services, entities, systems, and/or other parties, which may allow users to assert and/or otherwise assess a degree of trust in the authors and/or origin of content.

Certain embodiments disclosed herein may, for example and without limitation, allow the verified binding of an author of an article with an article. In at least one non-limiting example, an article may be verified to have been written by journalists of the Times Newspaper. Times Newspaper could be represented by a public key associated with the Times Newspaper, and a binding of a content identifier associated with the article and the public key for the Times Newspaper may be recorded in a trusted ledger.

Another article may be tagged with the verified providence of the Post Newspaper. Consistent with embodiments disclosed herein, the article from the Times Newspaper and the Post Newspaper may be rendered by a user using a trusted application with an indicia displayed associated with the verified attributes for the articles (e.g., the provenance of the articles, the authors of the articles, etc.).

In some circumstances, the user may wish to flag article(s) based on a different level of trust the user ascribes the source of the articles to differentiate between sources that the user trusts and does not trust. For example and without limitation, if a user trusts material from the Times Newspaper and not from the Post Newspaper, an indicia may be rendered in connection with the article(s) via a trusted application indicating whether the associated source is trusted and/or a level of trust associated with the source. In another non-limiting example, when a user browses aggregated content using a trusted application (e.g., browses a news media site), articles offered for rendering and/or associated links may highlight sources that the user trusts from those that the user does not trust (and/or associated levels of trust). In some implementations, for sources where there is less or no knowledge of a level of trust associated with the source, the displayed indicia may communicate that the trustedness of the source is unknown.

Figure 7:
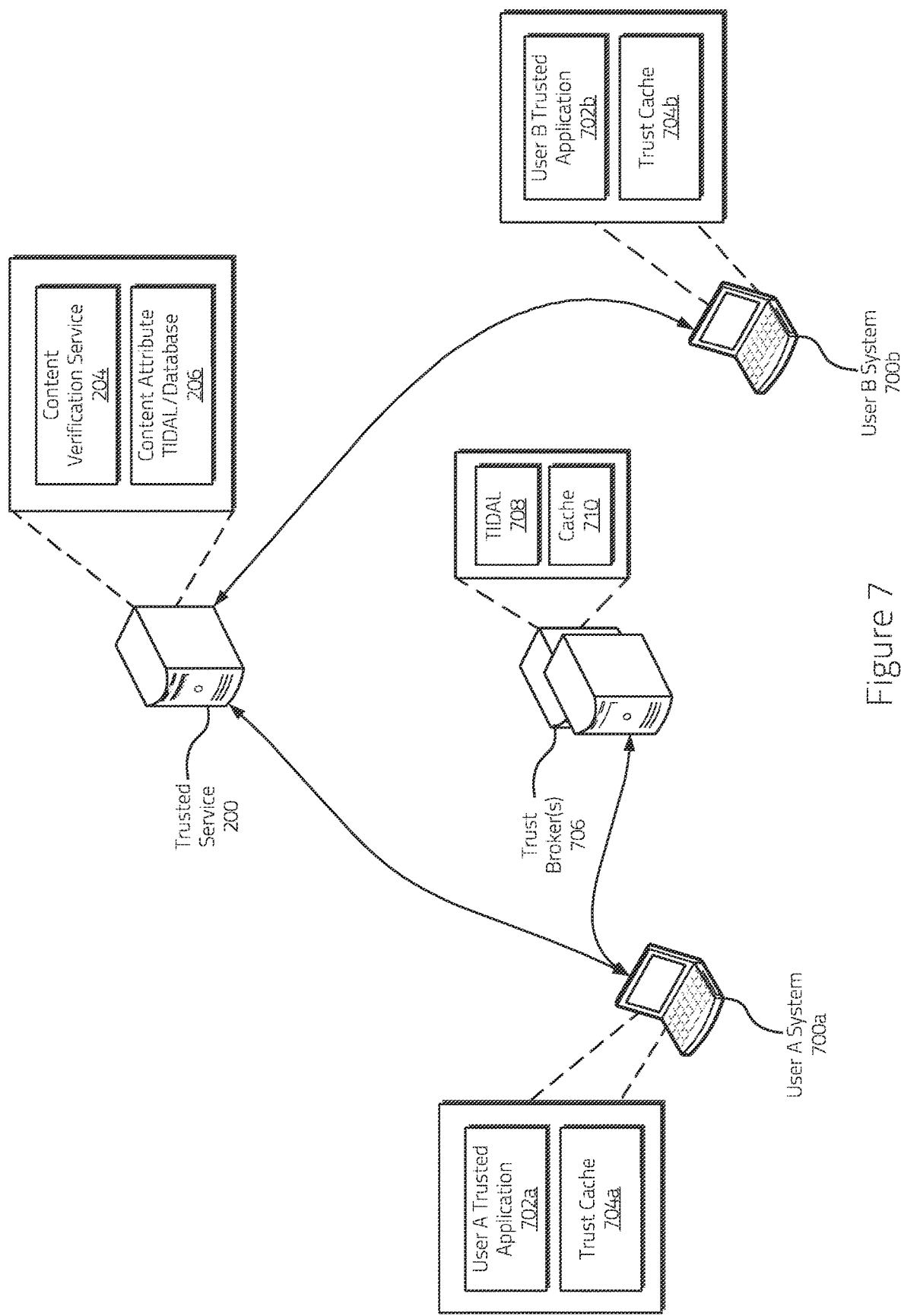
FIG. 7 illustrates a non-limiting example of a method for validating content using a trusted service and a trust broker service consistent with certain embodiments of the present disclosure.

FIG. 7 illustrates a non-limiting example of a method for validating content using a trusted service 200 and a trust broker service 706 consistent with certain embodiments of the present disclosure. In various disclosed embodiments, one or more trust broker services 706 may be used to register trusted associations between systems, services, entities, users, and/or the like. In certain embodiments, such associations may be recorded in a TIDAL 708 and/or a trusted ledger managed by the trust broker service 706 and/or another system and/or service (e.g., a plurality of ledger nodes maintain the TIDAL 708 that may or may not include the system implementing the trust broker service 706).

In some embodiments, trust assertions managed by the trust broker service 706 in the TIDAL 708 may be expressed as a trusted relationship between public keys associated with a pair of systems, services, entities, users, and/or the like. For example and without limitation, a trust assertion may be generally represented the form "Public Key A trusts Public Key B" or "Public Key A does not trust Public Key B."

In various embodiments, trusted service 200 may securely associate within a TIDAL 206 a content identifier with information associated with an author, originator, and/or other indication of provenance of the content. In some embodiments, the information associated with an author, originator, and/or other indication of provenance of the content may be represented by a public key of an associated party and/or entity.

Consistent with embodiments disclosed herein, the trust broker service 706 may maintain assertions relating to trusted relationships between systems, services, entities, users, and/or the like within TIDAL 708. For example and without limitation, the trust broker service 706 may maintain in TIDAL 708 an assertion indicating that a user of trusted browser application 702*a* and/or user system 700*a* trusts a given source or does not trust a given source. When the trusted application 702*a* renders content for the user, it may leverage the trust assertions from the trust broker service 706 to provide an indicia to the user not only of the veracity of the attributes bound to rendered content, but also an indication of the user's trust in the author/publisher of the content.

Consistent with embodiments disclosed herein, trust between various systems, services, entities, users, parties, and/or the like may be transitive. In some embodiments, multiple systems, services, entities, users, parties, and/or the like may leverage a trust broker service 706 to assert trust between their public keys and/or other public keys, forming a web and/or graph of trust. For example, a user of system 700*a* and/or trusted application 702*a*—User A—may trust a user of system 700*b* and/or trusted application 702*b*—User B—who in turn may trust a user of another system (not shown—User C. A user of trusted applications 702*a*, 702*b* may choose to use transitive trust relationships to determine the trustedness of given content rendered via the trusted applications 702*a*, 702*b*.

For example and without limitation, if User A trusts User B and User B trusts the Times Newspaper based on verified trust relationships recorded in the TIDAL 708 maintained by the trust broker service 706, it may be inferred (if permitted by a policy associated with User A and/or trusted application 702*a* that User A also trusts the Times Newspaper by virtue of a transitive trust relationship through User B. Similarly, negative trust associations may be asserted and/or managed using various disclosed embodiments. For example and without limitation, User A may assert that they do not trust User B, or User B may assert that they do not trust the Times Newspaper. In this example, trusted application 702*a* may render an indicia with content from the Times Newspaper that indicates that it is not trusted, as User A does not trust the Times Newspaper because they trust User B who does not trust the Times Newspaper.

In various embodiments, levels of transitive trust may be employed in connection with various disclosed embodiments. For example, a user may configure policy managed by trusted applications 702*a*, 702*b* to determine how transitive properties of trusted relationships should be managed by the trusted applications 702*a*, 702*b* (e.g., by indicating a degree, a depth, and/or the like, to which transitive trust relationships may apply. For example and without limitation, a user may indicate via policy that they trust news organizations trusted by their immediate friends, but do not trust new organizations trusted by other friends who their immediate friends trust. In another non-limiting example, a user may indicate via policy that they trust content providers trusted by a subset of their friends, but not those providers trusted by a different subset of their friends. It will be appreciated that a variety of policies with a variety of granularities may be employed in connection with managing transitive trusted relationships, and that any suitable policy and/or level of detail articulated in a policy may be used in connection with various disclosed embodiments.

In certain embodiments, to improve scalability of transitive trust determinations, a plurality of transitive trust brokers 706 may be used. Similar to a domain name system ("DNS") service of the Internet mapping domain names to IP addresses, a transitive trust broker 706 may not maintain all trust assertions locally but may defer to other transitive trust brokers to more quickly look up in TIDALs and/or ledgers whether a given trust assertion has been recorded. In some embodiments, hashes of public keys may form a sequence of bytes, such that the space of all trust assertions may be partitioned, by some prefix of the trust assertions, easing lookup within associated TIDALs and/or ledgers.

In some embodiments, one or more caches 704*a*, 704*b*, 710 may be employed by and/or otherwise included in one or more of the systems and/or services (e.g., systems 700*a*, 700*b*, trusted service 200, trust broker(s) 706, etc.), which may store various information relating to assertion queries (e.g., content assertion queries, trust assertion queries, etc.) issued to ledgers and/or associated systems and/or services. In certain embodiments, use of caches may enable relatively fast lookup in connection with certain queries.

General System Architecture

Figure 8:
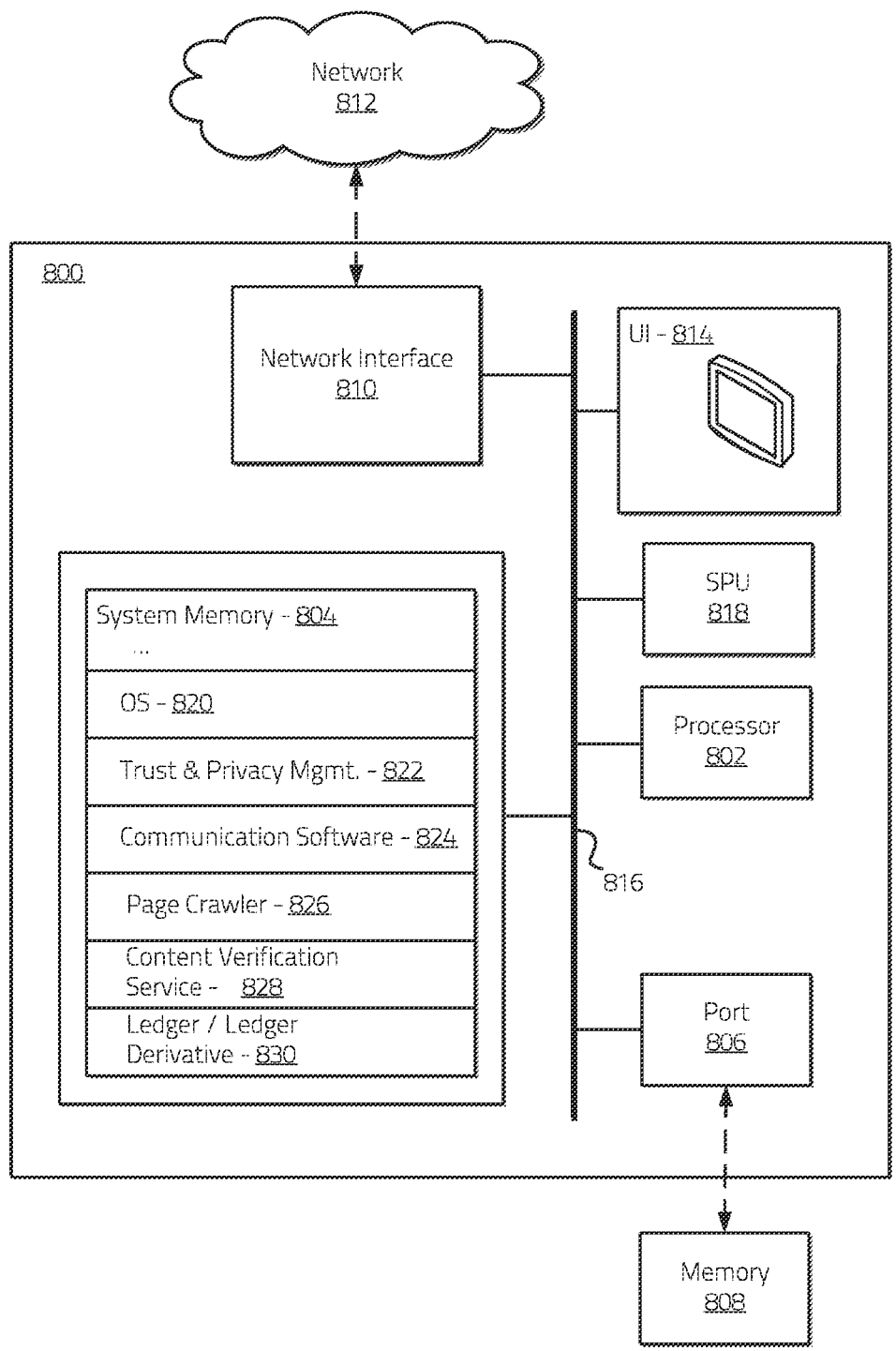
FIG. 8 illustrates an example of a system that may be used to implement certain embodiments of the systems and methods of the present disclosure.

FIG. 8 illustrates an example of a system that may be used to implement certain embodiments of the systems and methods of the present disclosure. The system of FIG. 8 and/or aspects thereof may be included in a system and/or device associated with an assertion submitter, a witness, distributed ledger node operator, a content generation and/or processing system, a user system, a trusted service, a trust broker service, and/or a querying system consistent with embodiments disclosed herein, and/or any other system, service, device, entity, node, application, and/or component configured to implement embodiments of the disclosed systems and methods.

The various systems and/or devices used in connection with aspects the disclosed embodiments may be communicatively coupled using a variety of networks and/or network connections (e.g., network 812). In certain embodiments, the network 812 may comprise a variety of network communication devices and/or channels and may utilize any suitable communications protocols and/or standards facilitating communication between the systems and/or devices. The network 812 may comprise the Internet, a local area network, a virtual private network, and/or any other communication network utilizing one or more electronic communication technologies and/or standards (e.g., Ethernet or the like). In some embodiments, the network 812 may comprise a wireless carrier system such as a personal communications system ("PCS"), and/or any other suitable communication system incorporating any suitable communication standards and/or protocols. In further embodiments, the network 2112 may comprise an analog mobile communications network and/or a digital mobile communications network utilizing, for example, code division multiple access ("CDMA"), Global System for Mobile Communications or Groupe Special Mobile ("GSM"), frequency division multiple access ("FDMA"), and/or time divisional multiple access ("TDMA") standards. In certain embodiments, the network 812 may incorporate one or more satellite communication links. In yet further embodiments, the network 812 may utilize IEEE's 802.11 standards, Bluetooth®, ultra-wide band ("UWB"), Zigbee®, and or any other suitable standard or standards.

The various systems and/or devices used in connection with aspects of the disclosed embodiments may comprise a variety of computing devices and/or systems, including any computing system or systems suitable to implement the systems and methods disclosed herein. For example, the connected devices and/or systems may comprise a variety of computing devices and systems, including laptop computer systems, desktop computer systems, server computer systems, distributed computer systems, smartphones, tablet computers, and/or the like.

In certain embodiments, the systems and/or devices may comprise at least one processor system configured to execute instructions stored on an associated non-transitory computer-readable storage medium. As discussed in more detail below, systems used in connection with implementing various aspects of the disclosed embodiments may further comprise a secure processing unit ("SPU") configured to perform sensitive operations such as trusted credential and/or key management, cryptographic operations, secure policy management, and/or other aspects of the systems and methods disclosed herein. The systems and/or devices may further comprise software and/or hardware configured to enable electronic communication of information between the devices and/or systems via a network using any suitable communication technology and/or standard.

As illustrated in FIG. 8, the example system 800 may comprise: a processing unit 802; system memory 804, which may include high speed random access memory ("RAM"), non-volatile memory ("ROM"), and/or one or more bulk non-volatile non-transitory computer-readable storage mediums (e.g., a hard disk, flash memory, etc.) for storing programs and other data for use and execution by the processing unit 802; a port 806 for interfacing with removable memory 808 that may include one or more diskettes, optical storage mediums (e.g., flash memory, thumb drives, USB dongles, compact discs, DVDs, etc.) and/or other non-transitory computer-readable storage mediums; a network interface 810 for communicating with other systems via one or more network connections and/or networks 812 using one or more communication technologies; a user interface 814 that may include a display and/or one or more input/output devices such as, for example, a touchscreen, a keyboard, a mouse, a track pad, and the like; and one or more busses 416 for communicatively coupling the elements of the system.

In some embodiments, the system 800 may, alternatively or in addition, include a trusted execution environment and/or an SPU 818 that is protected from tampering by a user of the system or other entities by utilizing secure physical and/or virtual security techniques. A trusted execution environment and/or a SPU 818 can help enhance the security of sensitive operations such as personal information management, trusted credential, token, and/or key management, privacy and policy management, and other aspects of the systems and methods disclosed herein. In certain embodiments, the trusted execution environment and/or SPU 818 may operate in a logically secure processing domain and be configured to protect and operate on secret information, as described herein. In some embodiments, the trusted execution environment and/or a SPU 818 may include internal memory storing executable instructions or programs configured to enable the SPU 818 to perform secure operations, as described herein.

The operation of the system 800 may be generally controlled by the processing unit 802 and/or an SPU 818 operating by executing software instructions and programs stored in the system memory 804 (and/or other computer-readable media, such as memory 808, which may be removable). The system memory 804 may store a variety of executable programs or modules for controlling the operation of the system. For example, the system memory may include an operating system ("OS") 820 that may manage and coordinate, at least in part, and/or system hardware resources and provide for common services for execution of various applications.

The system memory 804 may further include, without limitation, a trust and/or privacy management module 822, communication software 824 configured to enable in part communication with and by the system 800, one or more applications, a page crawler module 826 configured to perform various content crawling operations consistent with aspects of the disclosed embodiments, a content verification service 828 consistent with various disclosed embodiments, and a database, ledger, and/or ledger derivative, which may comprise a TIDAL 830, consistent with embodiments disclosed herein, and/or any other information, modules, and/or applications configured to implement embodiments of the systems and methods disclosed herein.

The systems and methods disclosed herein are not inherently related to any particular computer, electronic control unit, or other apparatus and may be implemented by a suitable combination of hardware, software, and/or firmware. Software implementations may include one or more computer programs comprising executable code/instructions that, when executed by a processor, may cause the processor to perform a method defined at least in part by the executable instructions. The computer program can be written in any form of programming language, including compiled or interpreted languages, and can be deployed in any form, including as a standalone program or as a module, component, subroutine, or other unit suitable for use in a computing environment. Further, a computer program can be deployed to be executed on one computer or on multiple computers at one site or distributed across multiple sites and interconnected by a communication network.

Software embodiments may be implemented as a computer program product that comprises a non-transitory storage medium configured to store computer programs and instructions, that when executed by a processor, are configured to cause the processor to perform a method according to the instructions. In certain embodiments, the non-transitory storage medium may take any form capable of storing processor-readable instructions on a non-transitory storage medium. A non-transitory storage medium may be embodied by a compact disk, digital-video disk, a magnetic disk, flash memory, integrated circuits, or any other non-transitory digital processing apparatus memory device.

Although the foregoing has been described in some detail for purposes of clarity, it will be apparent that certain changes and modifications may be made without departing from the principles thereof. It should be noted that there are many alternative ways of implementing both the systems and methods described herein. Accordingly, the present embodiments are to be considered as illustrative and not restrictive, and the invention is not to be limited to the details given herein but may be modified with the scope and equivalents of the appended claims.

What is claimed is:

1. A method for verifying content performed by a trusted service system, the trusted service system comprising a processor and a non-transitory computer-readable storage medium storing instructions that, when executed by the processor, cause the system to perform the method, the method comprising:

identifying, by a crawler service executing on the trusted service system, at least one content item included in a content library, the content library comprising a plurality of webpages, the at least one content item comprising one or more of audio content, video content, image content, and text content;

generating, based on the at least one content item, a candidate content assertion;

issuing a content query to one or more trusted content assertion ledger nodes, the content query comprising the candidate content assertion;

receiving, from the one or more trusted content assertion ledger nodes, at least one query response generated by the one or more trusted content assertion ledger nodes, the at least one query response comprising an indication of whether the candidate content assertion is recorded in at least one first trusted ledger managed by the one or more trusted content assertion ledger nodes, the at least one first trusted ledger comprising cryptographically linked ledger entries;

generating content attribute information based on the received at least one query response, the content attribute information comprising one or more of an indication of an integrity of the at least one content item, and indication of an authenticity of the at least one content item, and an indication of a provenance of the at least one content item; and associating the attribute information with the at least one content item.

2. The method of claim 1, wherein the at least one content item comprises content included in at least one webpage of the plurality of webpages.

3. The method of claim 1, wherein generating the candidate content assertion comprises performing at least one transformation operation on the at least one content item to generate the candidate content assertion.

4. The method of claim 3, wherein the at least one transformation comprises a hashing operation on the at least one content item.

5. The method of claim 1, wherein associating the attribute information with the at least one content item comprises storing the attribute information in metadata associated with the at least one content item.

6. The method of claim 1, wherein associating the attribute information with the at least one content item comprises storing the attribute information in a database.

7. The method of claim 6, wherein the database is managed by the trusted service system.

8. The method of claim 6, wherein the database is associated with a system separate from the trusted service system.

9. The method of claim 6, wherein the database comprises at least one second trusted ledger.

10. The method of claim 1, wherein the attribute information comprises an identifier of the at least one content item.

11. The method of claim 10, wherein the identifier of the at least one content item comprises a hash of the at least one content item.

12. The method of claim 1, wherein the method further comprises:

receiving, from a trusted application executing on a user system, a content verification query, the content verification query comprising an identifier associated with the at least one content item;

accessing, based on the identifier associated with the at least one content item, the attribute information associated with the at least one content item; and generating, based on the accessed attribute information, a content verification response; and transmitting the content verification response to the trusted application executing on the user system.

13. The method of claim 12, wherein the trusted application comprises a trusted browser application.

14. The method of claim 1, wherein the at least one first trusted ledger comprises a blockchain ledger.

15. The method of claim 1, wherein the at least one first trusted ledger comprises one or more entries derived from at least subset of entries of one or more other trusted ledgers.

16. The method of claim 1, wherein the method further comprises storing the content attribute information in a cache associated with the trusted service system.

* * * * *